(12) United States Patent
Cooksey et al.

(10) Patent No.: US 7,934,336 B2
(45) Date of Patent: May 3, 2011

(54) FISH PRESSURE EQUILIBRATING TOOL

(76) Inventors: Thomas C. Cooksey, Tallahassee, FL (US); Christopher M. Bennett, Tallahassee, FL (US)

( * ) Notice: Subject to any disclaimer, the term of this patent is extended or adjusted under 35 U.S.C. 154(b) by 0 days.

(21) Appl. No.: 12/217,387

(22) Filed: Jul. 3, 2008

(65) Prior Publication Data

US 2010/0000141 A1 Jan. 7, 2010

(51) Int. Cl.
*A01K 97/18* (2006.01)
*A01K 97/00* (2006.01)

(52) U.S. Cl. .............................................. 43/4; 43/53.5

(58) Field of Classification Search ............... 43/4, 53.5, 43/43.12; 604/272, 239, 181, 182, 192, 199; 7/106; 30/366; 83/866; 157/13
See application file for complete search history.

(56) References Cited

U.S. PATENT DOCUMENTS

| | | | | |
|---|---|---|---|---|
| 430,299 A * | 6/1890 | Rand | | 30/366 |
| 445,380 A * | 1/1891 | Philip | | 30/366 |
| 578,043 A * | 3/1897 | Pascoe | | 7/106 |
| 787,064 A * | 4/1905 | Welter | | 30/366 |
| 824,867 A * | 7/1906 | Houghton | | 30/366 |
| 964,950 A * | 7/1910 | Allinger | | 604/241 |
| 987,355 A * | 3/1911 | Godwin | | 30/366 |
| 1,150,387 A * | 8/1915 | Roberts | | 604/274 |
| 1,259,335 A * | 3/1918 | Acton | | 30/366 |
| 1,475,301 A * | 11/1923 | Hartleb | | 7/106 |
| 1,485,253 A * | 2/1924 | Devlin | | 83/660 |
| 1,825,077 A * | 9/1931 | Lawrence | | 30/140 |
| 2,050,194 A * | 8/1936 | Pflueger | | 43/53.5 |
| 2,370,958 A * | 3/1945 | Hellier | | 156/87 |
| 2,414,911 A * | 1/1947 | Temple | | 222/81 |
| 2,571,590 A * | 10/1951 | Logic | | 222/86 |
| 2,668,534 A * | 2/1954 | Barradas et al. | | 604/192 |
| 2,749,653 A * | 6/1956 | Patrowsky et al. | | 43/53.5 |
| 2,786,528 A * | 3/1957 | Wick | | 30/366 |
| 2,929,432 A * | 3/1960 | Funk et al. | | 152/415 |
| RE24,902 E * | 12/1960 | Dillard | | 43/53.5 |
| 3,050,896 A * | 8/1962 | Parker | | 43/53.5 |
| 3,076,457 A * | 2/1963 | Copen | | 604/272 |
| 3,154,985 A * | 11/1964 | Hermanns | | 83/868 |
| 3,277,893 A * | 10/1966 | Clark | | 604/130 |
| 3,326,206 A * | 6/1967 | Barr, Sr. et al. | | 604/239 |
| 3,349,821 A * | 10/1967 | Moeller | | 30/366 |
| 3,352,013 A * | 11/1967 | Fuller et al. | | 30/368 |
| 3,382,577 A * | 5/1968 | Rieder | | 30/366 |
| 3,395,704 A * | 8/1968 | Frey et al. | | 30/366 |
| 3,403,466 A * | 10/1968 | Young | | 43/4 |
| 3,419,924 A * | 1/1969 | Archibald | | 43/53.5 |
| 3,448,520 A * | 6/1969 | Fuller et al. | | 30/366 |
| 3,797,112 A * | 3/1974 | Paulson | | 30/366 |
| 3,825,961 A * | 7/1974 | Klein | | 7/106 |
| 4,073,083 A * | 2/1978 | Davis | | 43/4 |
| 4,118,881 A * | 10/1978 | McFarlane | | 43/4 |
| 4,127,957 A * | 12/1978 | Bourquin et al. | | 43/53.5 |
| 4,129,955 A * | 12/1978 | Schommer | | 43/4 |

(Continued)

*Primary Examiner* — Darren W Ark
(74) *Attorney, Agent, or Firm* — J. Wiley Horton

(57) ABSTRACT

A tool for releasing excess air from the swim bladder of a fish. The present invention includes a puncturer situated in a housing and a push rod which extends out of the housing for pushing the puncturer out of the housing and into the swim bladder of the fish. When the tool is employed, the excess air passes through the puncturer into the housing and then out vents located in the side wall of the housing. The puncturer is spring biased to remain in the covered position until the user applies an external force to the push rod to expose the puncturer.

17 Claims, 10 Drawing Sheets

U.S. PATENT DOCUMENTS

| | | | |
|---|---|---|---|
| 4,403,797 A * | 9/1983 | Ragland, Jr. | 43/4 |
| 4,590,702 A * | 5/1986 | Chestnutt | 43/53.5 |
| 4,664,653 A * | 5/1987 | Sagstetter et al. | 604/192 |
| 4,674,220 A * | 6/1987 | Bearce et al. | 43/4 |
| 4,706,403 A * | 11/1987 | Reynolds | 43/4 |
| 4,713,886 A * | 12/1987 | Ikeda | 30/366 |
| 4,833,817 A * | 5/1989 | Silverthorn | 43/53.5 |
| 4,914,853 A * | 4/1990 | Swindle | 43/53.5 |
| 4,915,631 A * | 4/1990 | Robinson et al. | 43/4 |
| 5,099,579 A * | 3/1992 | Chadwick | 30/366 |
| 5,119,585 A * | 6/1992 | Camp | 43/53.5 |
| 5,136,744 A * | 8/1992 | Allsop et al. | 43/4 |
| 5,242,414 A * | 9/1993 | Fischell et al. | 604/272 |
| 5,250,066 A * | 10/1993 | Lambert | 604/272 |
| 5,259,399 A * | 11/1993 | Brown | 604/909 |
| 5,274,948 A * | 1/1994 | Harrison et al. | 43/53.5 |
| 5,283,920 A * | 2/1994 | Plummer | 43/4 |
| 5,306,259 A * | 4/1994 | Fischell et al. | 604/239 |
| 5,307,586 A * | 5/1994 | Palmer | 43/53.5 |
| 5,405,330 A * | 4/1995 | Zunitch et al. | 604/272 |
| 5,484,417 A * | 1/1996 | Waitz et al. | 604/239 |
| 5,514,113 A * | 5/1996 | Anderson et al. | 604/272 |
| 5,548,917 A * | 8/1996 | Holwadel | 43/1 |
| 5,557,874 A * | 9/1996 | Pietrandrea et al. | 43/4 |
| 5,600,914 A * | 2/1997 | Tatar | 43/4 |
| 5,709,667 A * | 1/1998 | Carilli | 604/192 |
| 5,784,830 A * | 7/1998 | Brumfield | 43/53.5 |
| 5,967,012 A * | 10/1999 | Dummer et al. | 83/451 |
| 5,983,555 A * | 11/1999 | Biel | 43/53.5 |
| 6,026,607 A * | 2/2000 | Bukowski | 43/53.5 |
| 6,038,808 A * | 3/2000 | Bergeron et al. | 43/53.5 |
| 6,065,238 A * | 5/2000 | Carter et al. | 43/4 |
| 6,205,698 B1 * | 3/2001 | Richards | 43/53.5 |
| 6,223,441 B1 * | 5/2001 | Parsons | 30/366 |
| 6,305,118 B1 * | 10/2001 | Wacha | 43/4 |
| 6,393,756 B1 * | 5/2002 | Forney et al. | 43/42.06 |
| 6,397,513 B1 * | 6/2002 | Reed | 43/53.5 |
| 6,421,949 B1 * | 7/2002 | Schytte | 43/43.12 |
| 6,434,878 B1 * | 8/2002 | Milton | 43/4 |
| 6,478,769 B1 * | 11/2002 | Parker | 604/272 |
| 6,550,177 B1 * | 4/2003 | Epple, Jr. | 43/4 |
| 6,560,913 B1 * | 5/2003 | Liao | 43/53.5 |
| 6,625,920 B1 * | 9/2003 | Rockwell | 43/4 |
| 6,676,638 B2 * | 1/2004 | Takagi et al. | 604/192 |
| 6,679,199 B2 * | 1/2004 | Bankston | 43/4 |
| 6,681,513 B2 * | 1/2004 | Hill | 43/4 |
| 6,715,804 B2 * | 4/2004 | Beers | 43/4 |
| 6,769,212 B2 * | 8/2004 | Grayson | 43/4 |
| 6,846,302 B2 * | 1/2005 | Shemesh et al. | 604/192 |
| 6,880,252 B1 * | 4/2005 | Drake | 30/366 |
| 6,884,237 B2 * | 4/2005 | Asbaghi | 604/192 |
| 6,898,891 B1 * | 5/2005 | Needham | 43/4 |
| 6,926,696 B2 * | 8/2005 | Mohammed | 604/272 |
| 7,076,910 B1 * | 7/2006 | Xifra | 43/4 |
| 7,223,259 B2 * | 5/2007 | Marshall et al. | 604/192 |
| 7,393,344 B2 * | 7/2008 | Mohammed | 604/272 |
| 7,407,492 B2 * | 8/2008 | Gurtner | 604/181 |
| 7,412,914 B2 * | 8/2008 | Al-Majed | 30/366 |
| 7,434,350 B1 * | 10/2008 | Gomez et al. | 43/53.5 |
| 7,444,779 B2 * | 11/2008 | Hei | 43/53.5 |
| 7,470,258 B2 * | 12/2008 | Barker et al. | 604/192 |
| 7,478,497 B2 * | 1/2009 | Otsuka et al. | 43/4 |
| 7,534,231 B2 * | 5/2009 | Kuracina et al. | 604/192 |
| 7,676,982 B1 * | 3/2010 | Lee | 43/4 |
| 2001/0016713 A1 * | 8/2001 | Takagi et al. | 604/192 |
| 2002/0004652 A1 * | 1/2002 | Asbaghi | 604/192 |
| 2002/0017048 A1 * | 2/2002 | Lam | 43/4 |
| 2002/0045843 A1 * | 4/2002 | Barker et al. | 604/192 |
| 2002/0082560 A1 * | 6/2002 | Yang | 604/181 |
| 2002/0082564 A1 * | 6/2002 | Pham | 604/192 |
| 2003/0029075 A1 * | 2/2003 | Hebard | 43/53.5 |
| 2003/0163091 A1 * | 8/2003 | Bush et al. | 604/181 |
| 2004/0025408 A1 * | 2/2004 | Newman, Sr. | 43/53.5 |
| 2006/0195062 A1 * | 8/2006 | Gremel | 604/192 |
| 2007/0078403 A1 * | 4/2007 | Millerd | 604/192 |
| 2007/0089355 A1 * | 4/2007 | Burgett, Sr. | 43/53.5 |
| 2007/0173772 A1 * | 7/2007 | Liversidge | 604/192 |
| 2007/0199229 A1 * | 8/2007 | Carder et al. | 43/4 |
| 2008/0110077 A1 * | 5/2008 | Callaway | 43/4.5 |
| 2008/0177235 A1 * | 7/2008 | DiBiasi | 604/192 |
| 2008/0236019 A1 * | 10/2008 | Gollahon | 43/4 |
| 2008/0301998 A1 * | 12/2008 | Gallo | 43/53.5 |
| 2009/0025273 A1 * | 1/2009 | Gauger | 43/53.5 |
| 2009/0069751 A1 * | 3/2009 | Curtis et al. | 604/272 |
| 2009/0105661 A1 * | 4/2009 | Chevallier et al. | 604/192 |
| 2009/0149836 A1 * | 6/2009 | Teachout et al. | 604/540 |
| 2010/0005698 A1 * | 1/2010 | Raus | 43/4 |

* cited by examiner

FISH PRESSURE EQUILIBRATING TOOL

BACKGROUND OF THE INVENTION

1. Field of the Invention

This invention relates to the field of fishing tools. More specifically, the present invention comprises a tool for equilibrating the internal pressure of a fish brought up from "depth."

2. Description of the Related Art

Most fish use swim bladders to control their buoyancy. A fish normally expels air from its swim bladder as it returns to the surface from depth such that the volume of air in the fish's swim bladder remains relatively constant. When fishing at depths greater than 30 feet, it is not uncommon to bring a fish to the surface at such a fast rate that the fish's swim bladder overexpands (due to the decreasing pressure of water on the fish) and pours out of the fish's body cavity. While this does not pose a significant problem for fish that are kept by the fisherman, many fish pulled from depth must be released back into the water. This most often occurs because the fish is too small to legally keep without violating a size limit law or because keeping the fish would cause the fisherman to exceed a bag limit law. These released fish have a low probability of survival because of their inability to return to depth rapidly.

Only a few tools are currently marketed or otherwise available for equilibrating a fish's swim bladder before it is released. These devices typically include a puncturer which is used to perforate the swim bladder of the fish allowing the excess air to escape. Several such devices illustrated and described in U.S. Pat. No. 6,065,238 to Carter et al. Such devices suffer from similar shortcomings. First, some devices employ a fixed, exposed puncturer. These devices can be dangerous to use on a boat where the motion of the boat and slippery conditions can cause the fisherman to inadvertently puncture himself or another person on the boat with the tool. In order to make these devices safer, some employ puncturers which are excessively dull. Dull puncturers are difficult to use, however, because more force is required to push the puncturer through the body of the fish.

In order to alleviate the problems associated with such devices that employ fixed, exposed puncturers, Carter et al. proposed a tool which uses a moveable puncturer which moves between a covered state and an uncovered state. This design is illustrated in FIGS. 5 and 6 of the Carter et al. patent. This design is problematic, however, because the user's thumb must cover the ventilating orifice to hold the puncturer in the uncovered state.

As such, it would be beneficial to provide an equilibrating tool which is easy and safe to use.

BRIEF SUMMARY OF THE INVENTION

The present invention is a tool for releasing excess air from the swim bladder of a fish. The present invention includes a puncturer situated in a housing and a push rod which extends out of the housing for pushing the puncturer out of the housing and into the swim bladder of the fish. When the tool is employed, the excess air passes through the puncturer into the housing and then out vents located in the side wall of the housing. The puncturer is spring biased to remain in the covered position until the user applies an external force to the push rod to expose the puncturer. A removable cap is provided for covering the push rod when the tool is not being used.

To use the tool, the user simply removes the cap, places the bottom surface of the tool on the fish's abdomen and then presses the push rod. The user continues holding the push rod until all of the excess air is vented through the tool. The user then releases the push rod causing the puncturer to retract into the housing.

Figure 1:
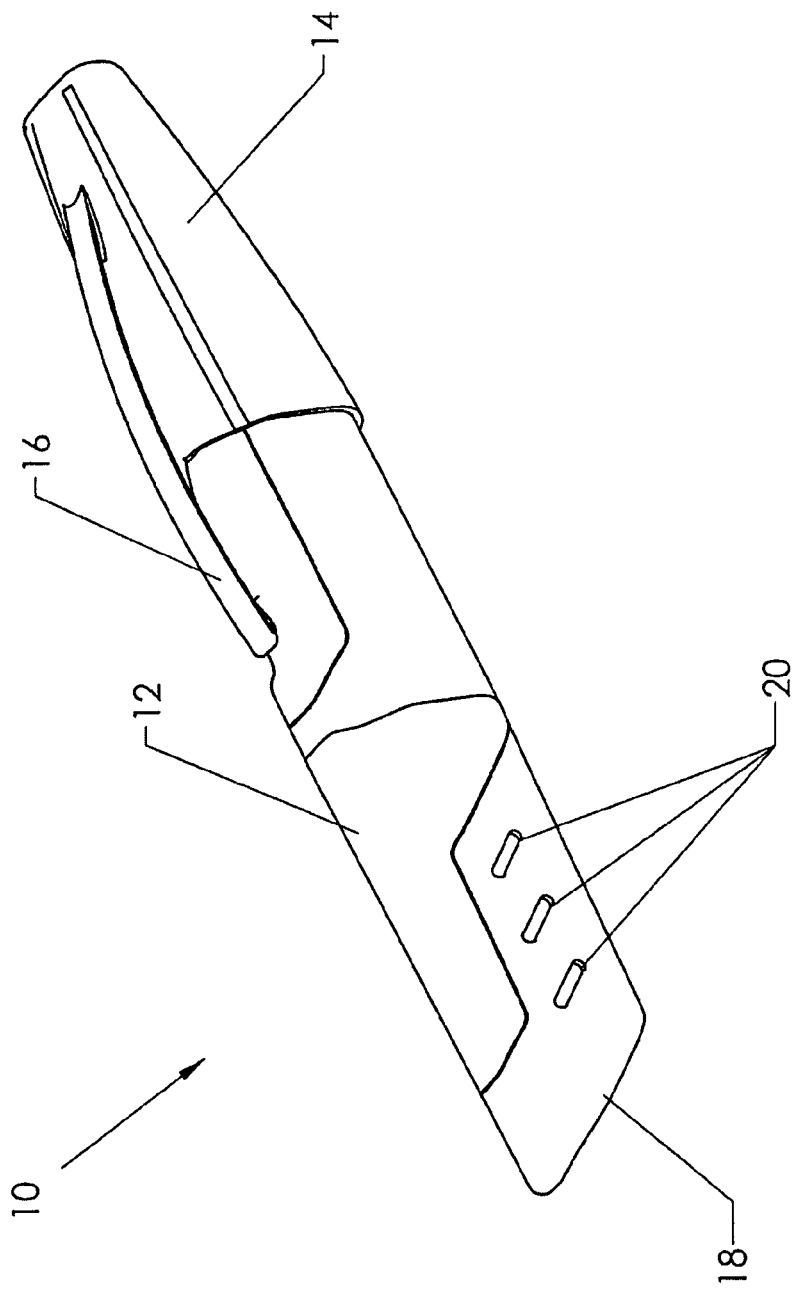
FIG. 1 is a perspective view, illustrating the present invention.

REFERENCE NUMERALS IN THE DRAWINGS 10 tool
12 housing
14 cap
16 clip
18 surface
20 vents
22 push rod
24 needle
26 orifice
28 orifice
30 syringe
32 connector
34 bottom portion
36 top portion
38 mating block
40 inner passageway
42 flange
44 flange
46 spring
48 air passages
50 receiver
52 manifold
54 gaps

DESCRIPTION OF THE INVENTION

The present invention, a tool which may be used to release excess air from the swim bladder of a fish, is illustrated in FIG. 1. Tool 10 includes housing 12 and cap 14 which is removable attached to one end of housing 12. Cap 14 includes clip 16 which may be used to attach tool 10 to a pocket or other object. Housing 12 includes surface 18 and sidewall vents 20 at the end of housing 12 opposite of cap 14.

Figure 2:
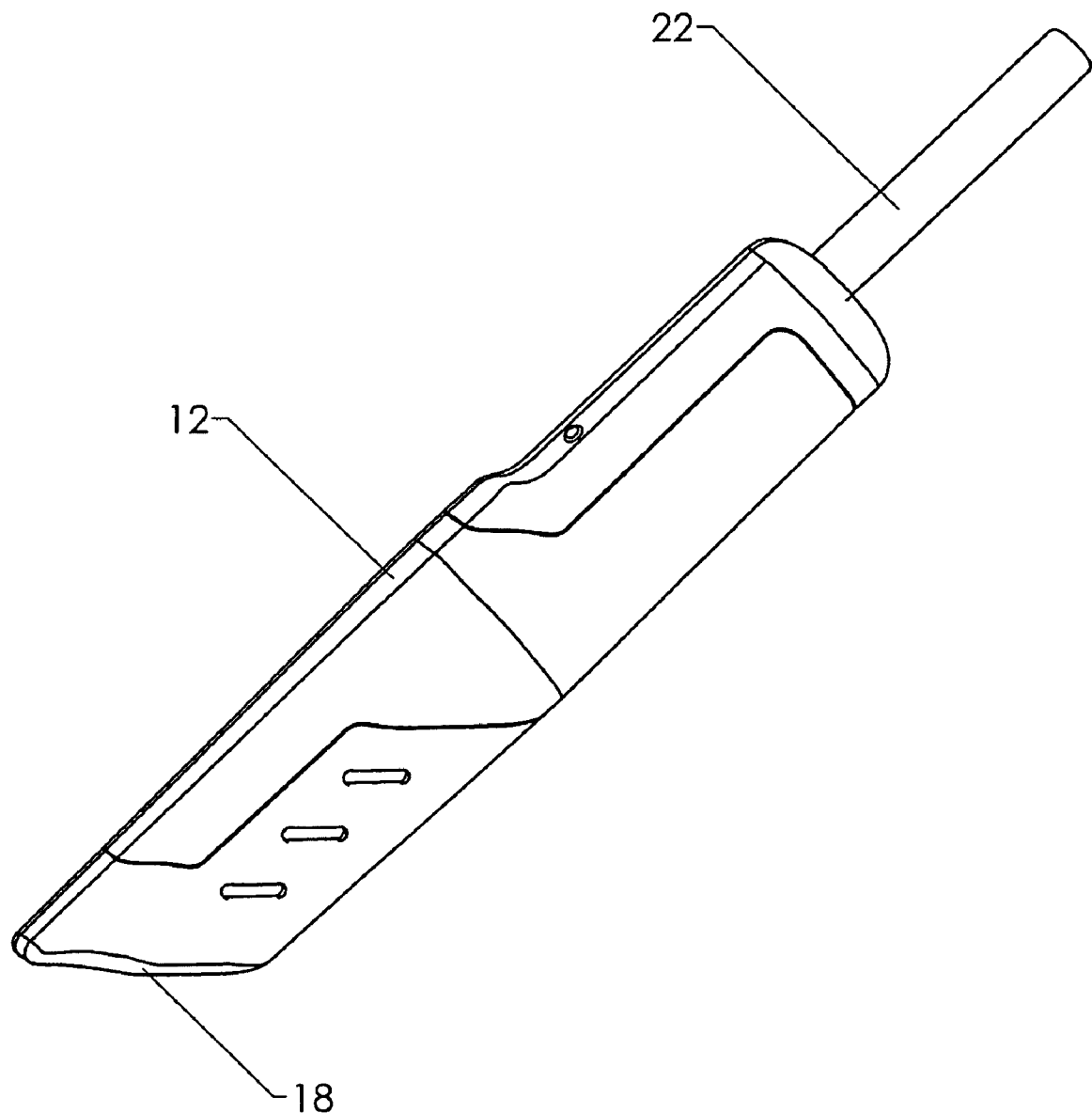
FIG. 2 is a perspective view, illustrating the present invention.
Figure 3:
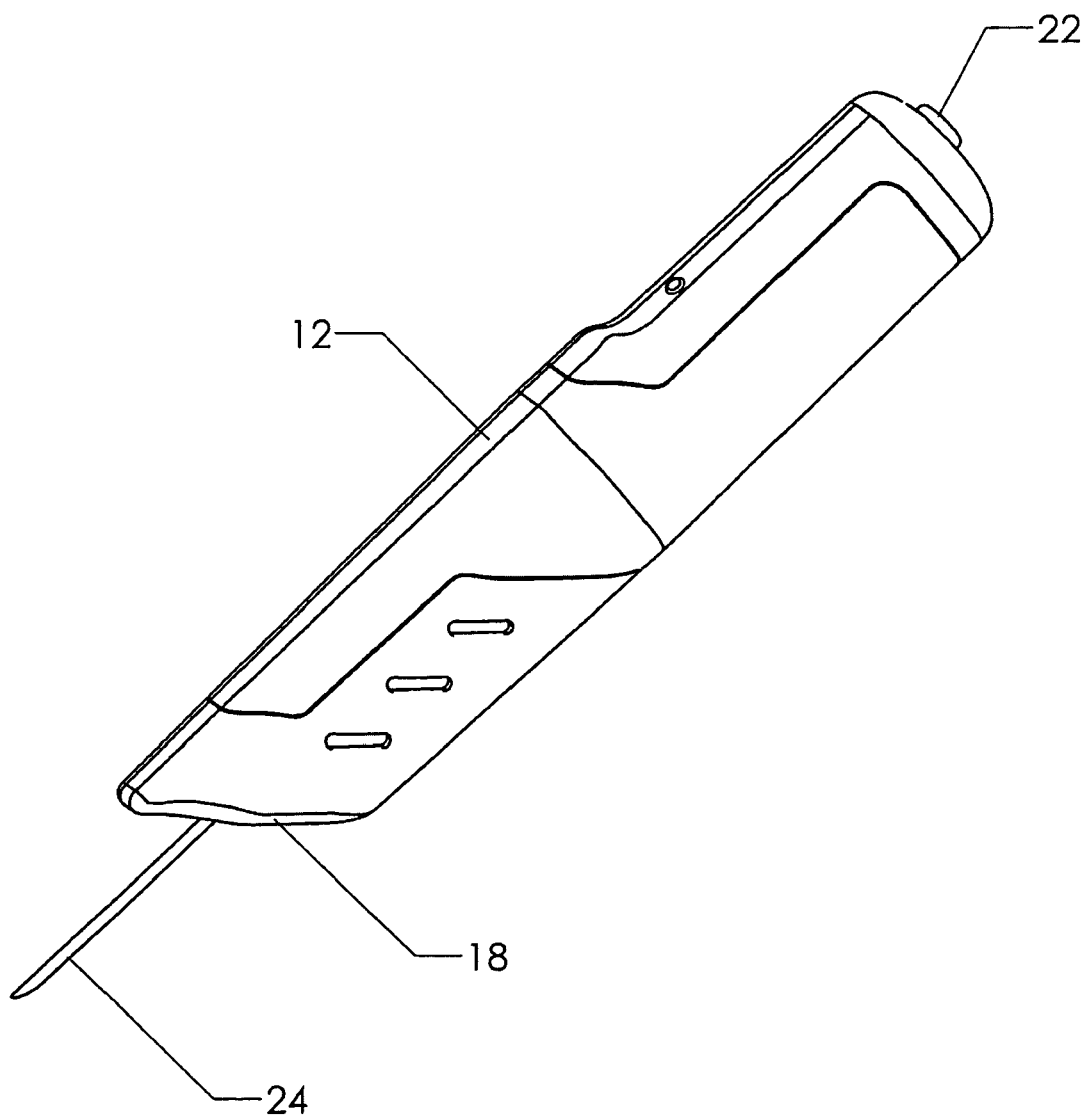
FIG. 3 is a perspective view, illustrating the present invention.

Turning to FIG. 2, cap 14 has been removed to reveal push rod 22. Push rod 22 extends into housing 12 where it mechanically engages the puncturer. As shown in FIG. 3, when push rod 22 is pressed into housing 12, needle 24 extends past surface 18. Thus, in order to use the invention, the user would normally grasp housing 12 with his or her palm and fingers and place the thumb on top of push rod 22. To improve gripping in wet conditions, a molded rubber gripping surface is provided on the side wall of housing 12.

Figure 4:
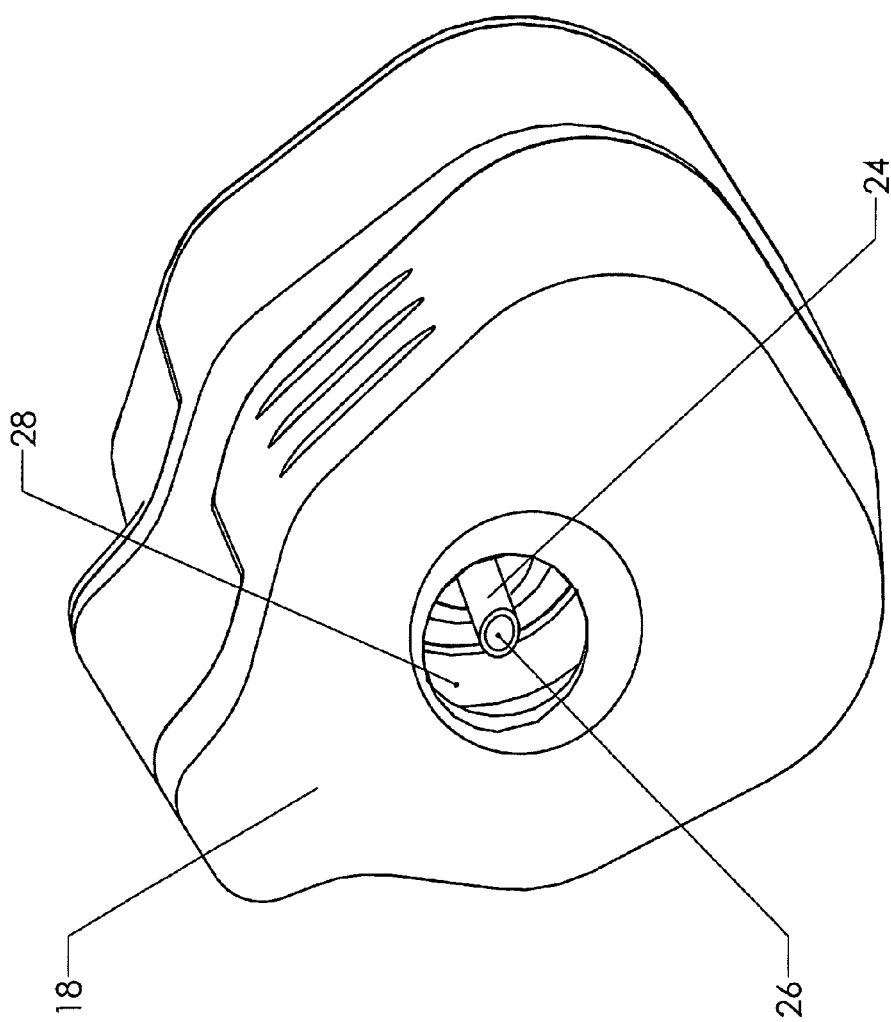
FIG. 4 is a perspective view, illustrating the present invention.
Figure 5:
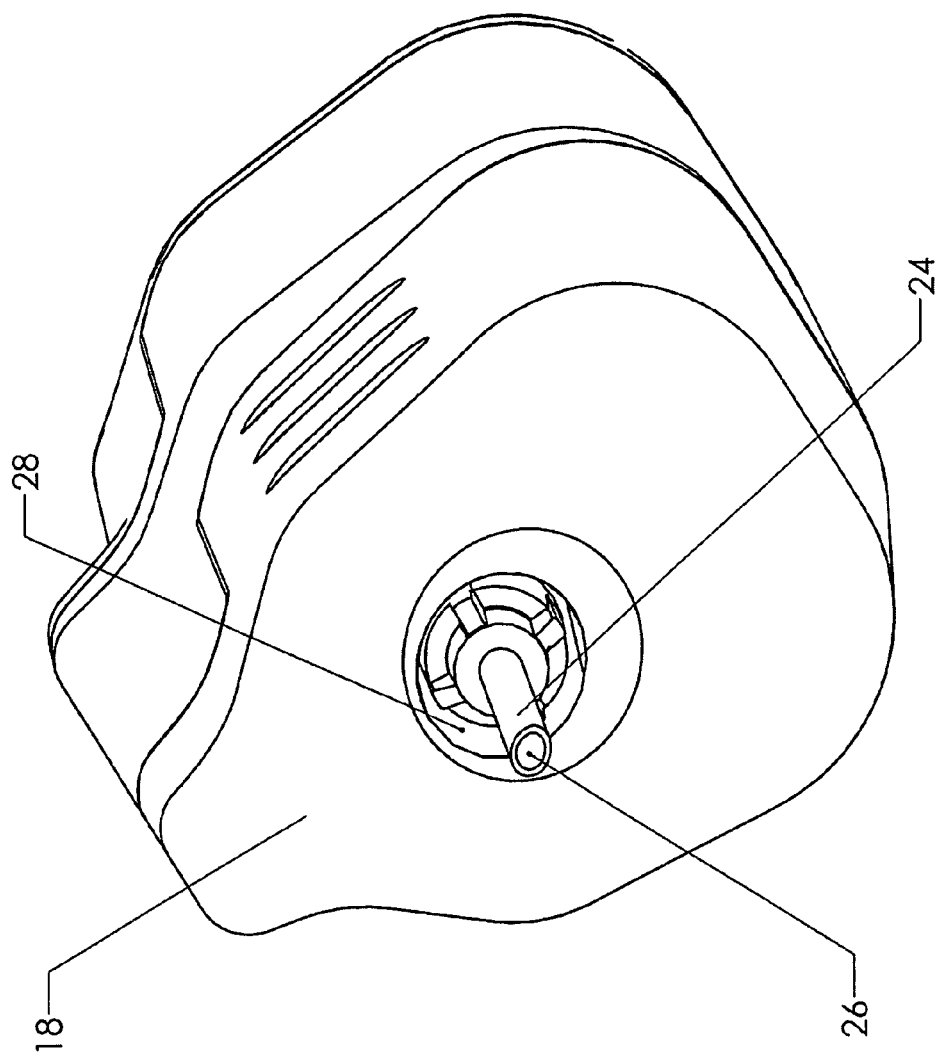
FIG. 5 is a perspective view, illustrating the present invention.

FIGS. 4 and 5 show tool 10 from the bottom with the puncturer in the covered state and exposed state, respectively. As shown in FIG. 4, needle 24 is contained within housing 12 behind surface 18. As shown in FIG. 5, when push rod 22 is pressed into housing 12, needle 24 extends through orifice 28 in surface 18. Needle 24 has orifice 26 at one end which is fluidly connected with an internal conduit. In the preferred embodiment, needle 24 is a 16 gauge hypodermic needle. This is the preferred thickness to facilitate the quick evacuation of excess air from the swim bladder without causing unnecessary injury to the fish.

Figure 6:
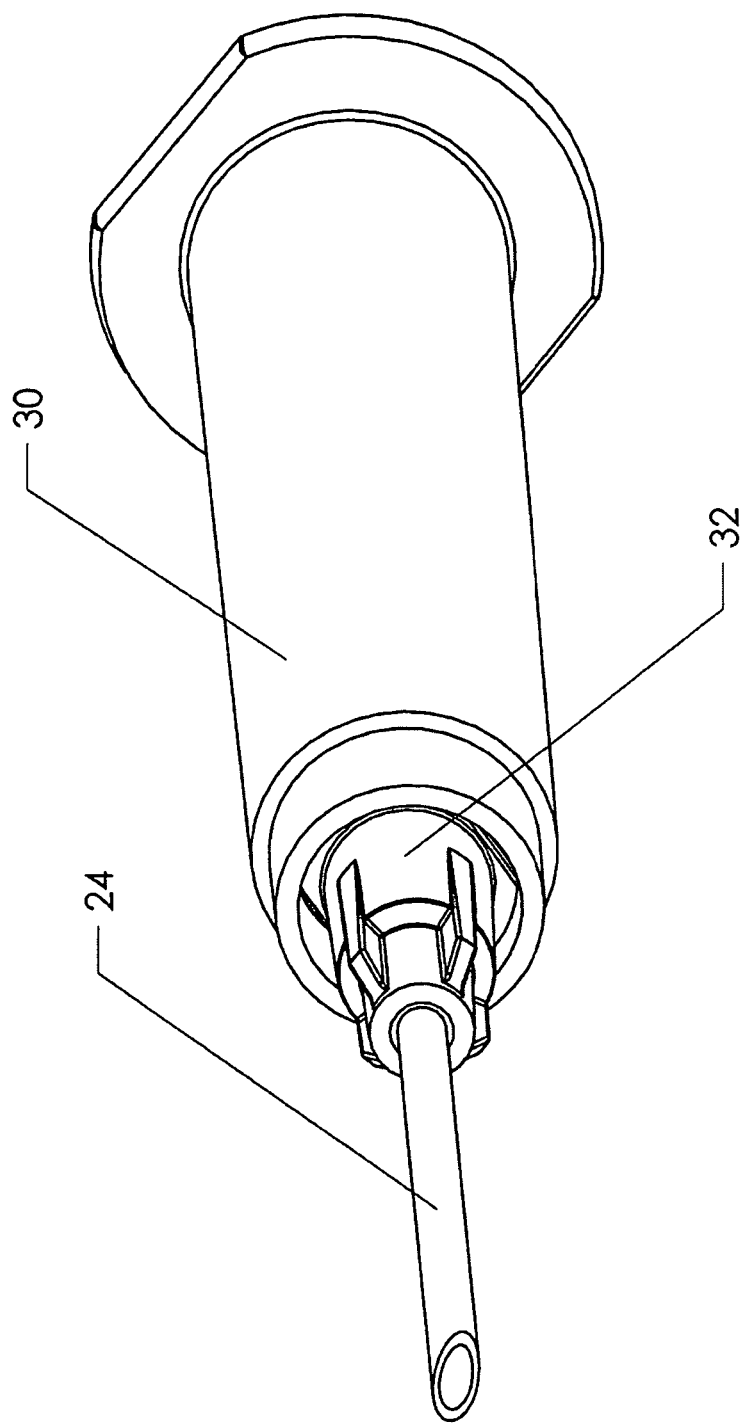
FIG. 6 is a perspective view, illustrating components of the present invention.

FIG. 6 shows a detailed view of some of the "moving" internal components of tool 10. Needle 24 is attached to syringe 30 by connector 32. The puncturing end of needle 24 is cut at an angle to facilitate penetration of the body of the fish.

Figure 7:
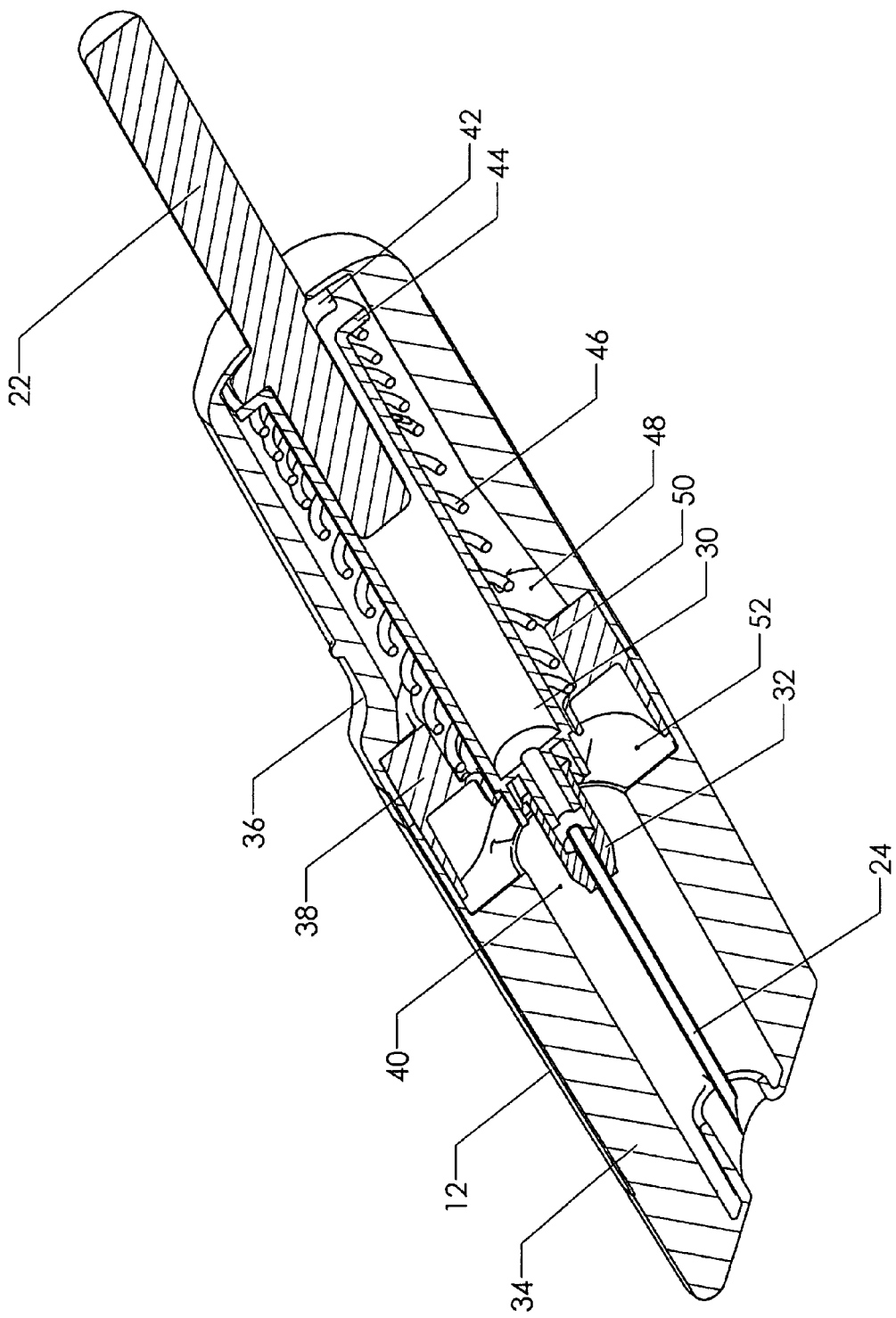
FIG. 7 is a section view, illustrating the present invention.

Turning to FIG. 7, the user will note that the conduit passing through needle 24 is fluidly connected with the hollow interior of connector 32 and the hollow interior of syringe 30. Needle 24 is normally contained in inner passageway 40 of housing 12. This prevents the user from inadvertently sticking himself or herself with needle 24 when handling tool 10.

Housing 12 includes top portion 36 and bottom portion 34 which attach together to hold the internal components of tool 10 in place. Top portion 36 and bottom portion 34 join around mating block 38. Mating block 38 maintains the alignment of syringe 30 and needle 24 as needle 24 travels from the covered position (shown in FIG. 7) to the exposed position (shown in FIG. 8). The reader will note that needle 24 travels along its central axis as it moves from the covered position to the exposed position.

Spring 46 is used to bias needle 24 in the covered state until the user exerts an external force on push rod 22. One end of spring 46 nests in receiver 50 of mating block 38. The other end of spring 46 mates with flange 44 of syringe 30. Push rod 22 is insertedly situated in the hollow interior of syringe 30. Flange 42 of push rod 22 mates with flange 44 of syringe 30 so that the external force supplied to push rod 22 is transmitted to syringe 30.

Figure 8:
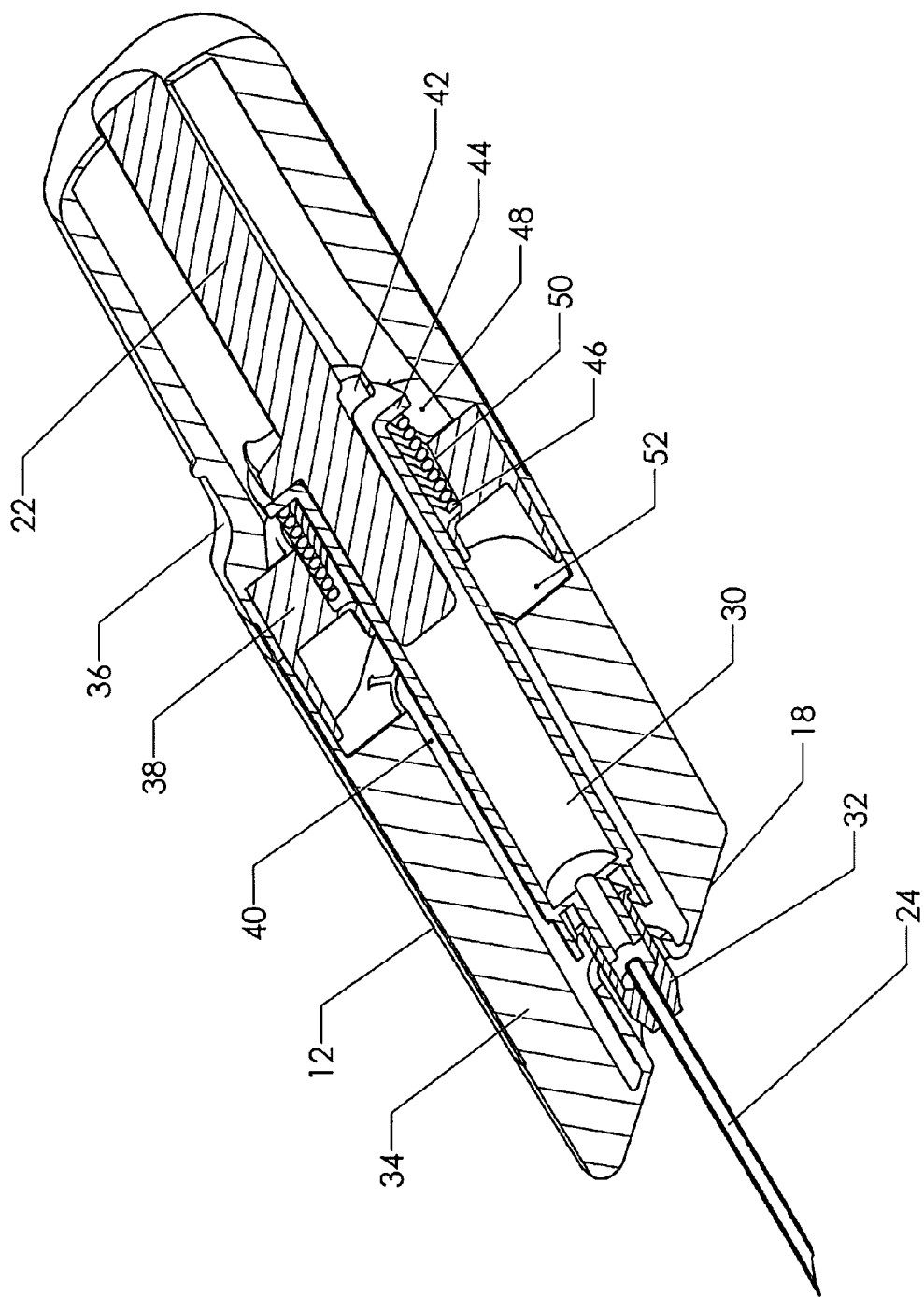
FIG. 8 is a section view, illustrating the present invention.

As shown in FIG. 8, spring 46 compresses between mating block 38 and flange 44 when push rod 22 is pushed into housing 12. Also, when push rod 22 is inserted into housing 12, syringe 30 extends through mating block 38 into inner passageway 40 and needle 24 extends through the orifice in the bottom surface of housing 12 as previously described.

Figure 9:
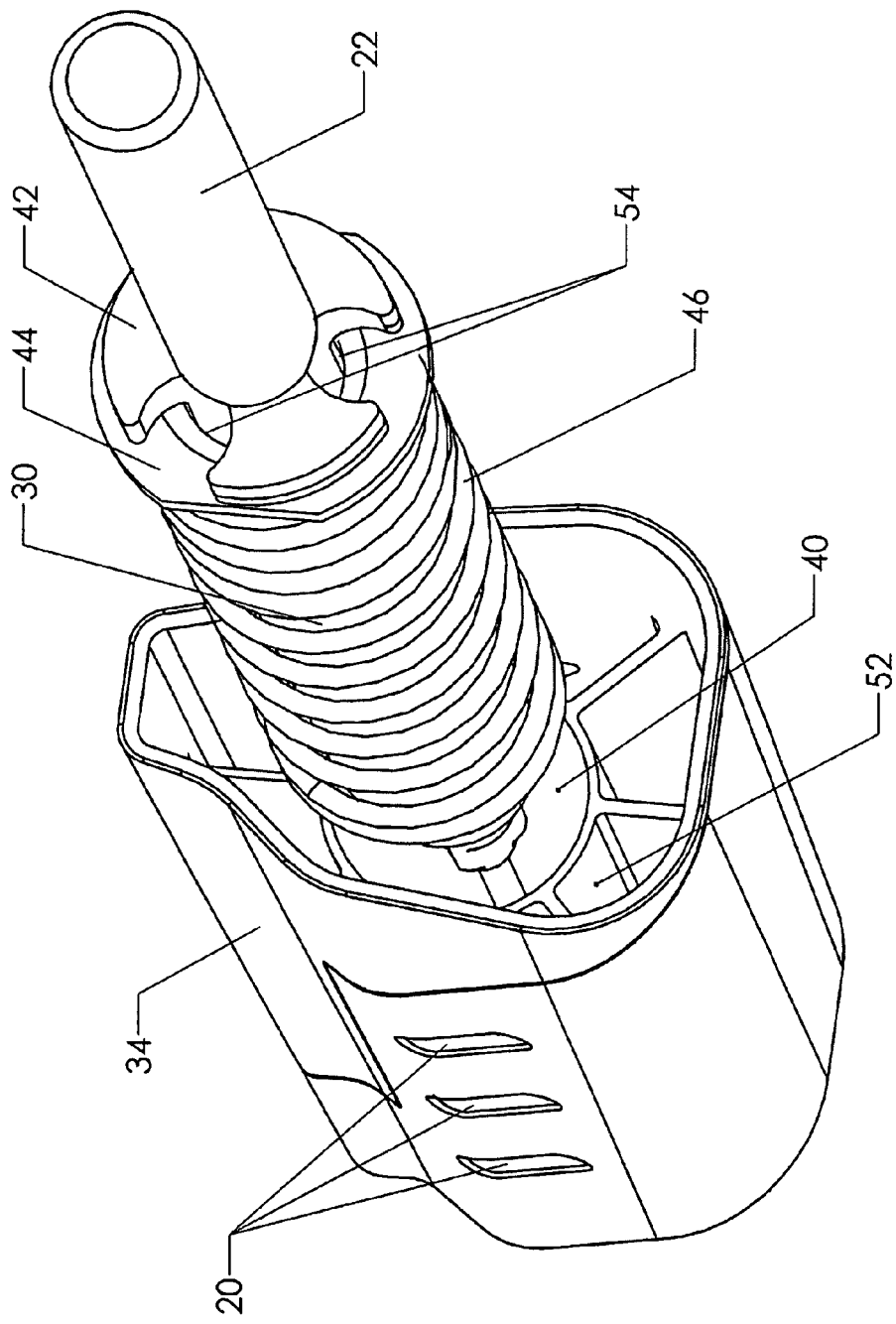
FIG. 9 is a perspective view, illustrating components of the present invention.

FIG. 9 shows tool 10 with mating block 38 and top portion 36 of housing 12 removed. The reader will now observe gaps 54 which are provided in flange 42 of push rod 22. Gaps 54 allow air to pass from the hollow interior of syringe 30 into top portion 36 of housing 12. The reader will also observe that bottom portion 34 includes manifold 52 which is fluidly connected with vents 20.

With the various components of the invention now described, the reader can now appreciate how tool 10 is used to relieve excess air from the swim bladder of a fish. To use tool 10, cap 14 is first removed to uncover push rod 22. Surface 18 is then placed against the abdomen of the fish and push rod 22 is pushed into housing 12. Referring to FIG. 8, pressurized air from the swim bladder of the fish is forced into the internal conduit of needle 24 and on into syringe 30 where it exits through gaps 54 in flange 42. The air then passes from top portion 36 of housing 12 into manifold 52 in bottom portion 34 of housing 12 through air passages 48 in mating block 38. Turning to FIG. 9, the air then exits manifold 52 through vents 20. As such the air exits housing 12 in a lateral direction relative to the center axis and direction of travel of needle 24 and syringe 30. Push rod 22 is held in its depressed state until all of the excess air is evacuated from the fish. The user may squeeze the fish lightly to facilitate the flow of air out of the swim bladder. The user then releases push rod 22 so that needle 24 retracts into housing 12.

Referring back to FIG. 8, the reader will note that surface 18 generally forms a plane that lies at an approximately 45 degree angle with respect to needle 24. This feature allows needle 24 to penetrate the swim bladder at the preferred 45 degree angle when surface 18 is placed flush against the "skin" of the fish behind the fish's pectoral fin and push rod 22 is depressed. This angle is believed to be optimal for relieving pressure without causing vital injury to the fish.

Figure 10:
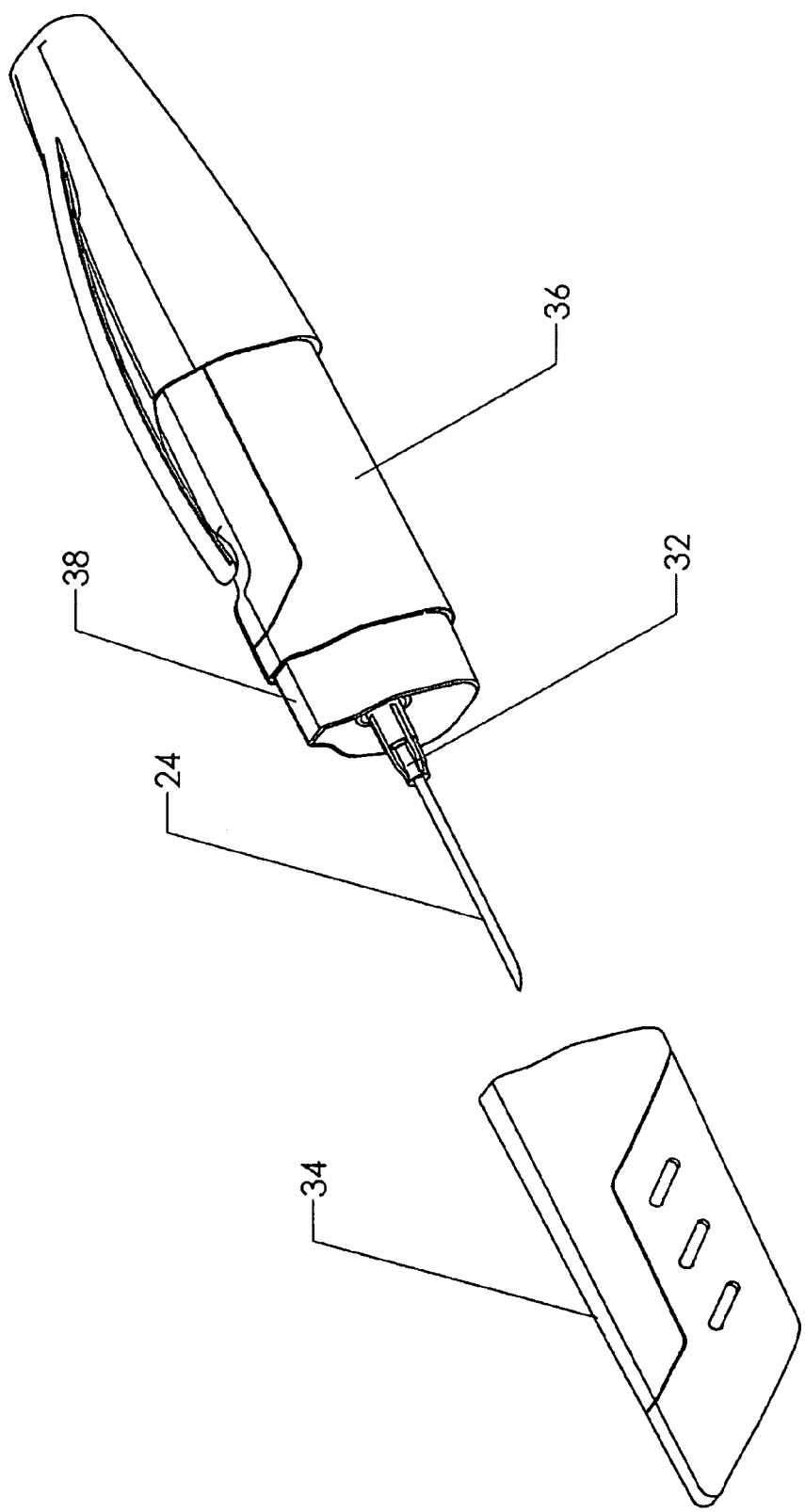
FIG. 10 is perspective view, illustrating how the housing may be separated.

Also, as shown in FIG. 10, the housing of tool 10 may be disassembled by disjoining bottom portion 34 from top portion 36 and mating block 38. Such disassembly may be used to facilitate cleaning of tool 10 or replacement of needle 24. Needle 24 and connector 32 are preferably an integrated unit which may be removed from the base of the syringe when needle 24 dulls or becomes damaged. A new needle and connector unit may then be attached to the base of the syringe.

Although the various components of tool 10 may be made of many different materials, it is preferred that a sufficient amount of low density material be used to enable tool 10 to float in the water. This would enable the user to easily retrieve tool 10 if it were inadvertently dropped from a boat.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

We claim:

1. A tool for releasing excess air from a swim bladder of a fish comprising:
    a. a housing having a first end, a second end, a side wall extending between said first end and said second end, and an interior, said first end having a surface and an opening in said surface, said surface lying substantially in a plane;
    b. a push rod extending out of said second end of said housing, said push rod having a top, said push rod moveable between a first position where said top lies distal to said second end of said housing and a second position where said top lies adjacent to said second end of said housing;
    c. a syringe having a first end and a second end, said first end of said syringe being attached to said push rod, said syringe lying within said housing interior, and said syringe including an enclosed volume;
    d. a needle, said needle having a first end and a second end and a conduit extending between said first end and said second end, said first end of said needle being attached to said second end of said syringe so that said push rod, said syringe, and said needle move in unison;
    e. wherein when said push rod is located in said first position, said needle is completely contained within said housing, and wherein when said push rod is located in said second position, said needle extends through said opening in said surface of said housing;
    f. wherein said needle travels along a center axis when said push rod travels between said first and second positions;
    g. wherein said plane defining said first end of said housing intersects said center axis at an acute angle; and h. wherein said needle being in communication with said syringe, said syringe being in communication with said interior of said housing, and said interior of said housing being in communication with an ambient environment such that said needle vents into said syringe, said syringe vents into said interior of said housing, and said interior of said housing vents to the ambient environment, whereby gas vented from said fish when said needle is inserted into said swim bladder of said fish must pass through said needle into said syringe, out of said syringe, into said interior of said housing, and then out of said housing to the ambient environment.

2. The tool of claim 1, wherein said acute angle is approximately 45 degrees.

3. A tool for releasing excess air from a swim bladder of a fish comprising:
   a. a housing having a first end, a second end, a side wall extending between said first end and said second end, and an interior, said first end having a surface and an opening in said surface;
   b. a push rod extending out of said second end of said housing, said push rod having a top, said push rod moveable between a first position where said top lies distal to said second end of said housing and a second position where said top lies adjacent to said second end of said housing;
   c. a puncturer situated within said housing, said puncturer including
      i. a syringe including a first end attached to said push rod and a second end distal to said push rod,
      ii. said syringe including an enclosed volume,
      iii. a needle having a mounting end, a tip, and an internal passage passing from said tip to said mounting end,
      iv. said mounting end of said needle being connected to said syringe with said internal passage connecting to said enclosed volume within said syringe,
      v. a first vent connecting said enclosed volume within said syringe to said interior of said housing, so that a pressurized flow entering said needle through said tip must pass through said needle, through said enclosed volume within said syringe, and through said first vent;
   d. wherein when said top of said push rod lies distal to said housing, said needle is completely contained within said housing, and wherein when said top of said push rod lies adjacent to said housing, said needle extends through said opening in said surface of said housing;
   e. a second vent in said side wall of said housing, whereby gas vented from said fish when said needle is inserted into said swim bladder of said fish must pass through said needle into said syringe, out of said syringe and into said interior of said housing through said first vent, and then out of said interior of said housing through said second vent.

4. The tool of claim 3, said puncturer having a central axis aligned with said needle and wherein when said puncturer moves along with said push rod said puncturer moves along said central axis.

5. The tool of claim 4, wherein said second vent is configured to permit said pressurized fluid to escape said housing in a lateral direction relative to said central axis.

6. The tool of claim 3, said first vent being proximal to said first end of said syringe.

7. The tool of claim 3, wherein said tool is configured to float in water.

8. The tool of claim 3, wherein said puncturer is biased to remain with said needle inside said housing until an external force is exerted on said push rod.

9. The tool of claim 3, said push rod having a flange configured to mate with said syringe, said flange having a gap including said first vent.

10. The tool of claim 3, further comprising a removable cap configured to attach to said housing proximal said second end of said housing and cover said push rod.

11. A tool for releasing excess air from a swim bladder of a fish comprising:
    a. a housing having a first end, a second end, a side wall extending between said first end and said second end, and an interior, said first end having a surface and an opening in said surface;
    b. a needle situated within said housing, said needle having a first end and a second end and a conduit extending between said first end and said second end of said needle;
    c. a syringe having a first end, a second end, and a hollow interior, said second end of said syringe attached to said first end of said needle;
    d. a push rod proximal said second end of said housing, said push rod having a top, said push rod moveable between a first position where said top lies distal to said second end of said housing and a second position where said top lies adjacent to said second end of said housing, said push rod having a flange;
    e. wherein said flange of said push rod mates with said first end of said syringe such that said push rod is mechanically linked to said syringe, and said push rod, said syringe, and said needle move together in unison;
    f. a first vent connecting said enclosed volume within said syringe to said interior of said housing, so that a pressurized flow through said needle must pass through said enclosed volume within said syringe, and through said first vent;
    g. wherein when said top of said push rod lies distal to said housing, said needle is completely contained within said housing, and wherein when said top of said push rod lies adjacent to said housing, said needle extends through said opening in said surface of said housing; and
    h. a second vent in said sidewall of said housing, whereby gas vented from said fish when said needle is inserted into said swim bladder of said fish must pass through said needle into said syringe, out of said syringe and into said interior of said housing through said first vent, and then out of said housing through said second vent.

12. The tool of claim 11, said needle having a central axis and wherein when said push rod, said syringe, and said needle move in unison, they travel along said central axis.

13. The tool of claim 12, wherein said second vent is configured to permit said pressurized fluid to escape said housing in a lateral direction relative to said central axis.

14. The tool of claim 12, said second vent proximal to said first end of said housing.

15. The tool of claim 11, wherein said tool is configured to float in water.

16. The tool of claim 11, wherein said needle is biased to remain within said housing until an external force is exerted on said push rod, and wherein said needle is further biased to return to lying within said housing when said external force is removed.

17. The tool of claim 11, further comprising a removable cap configured to attach to said housing proximal said second end of said housing and cover said push rod.

* * * * *